(No Model.)
J. RICHARDS.
PISTON PACKING.
No. 487,494.  Patented Dec. 6, 1892.
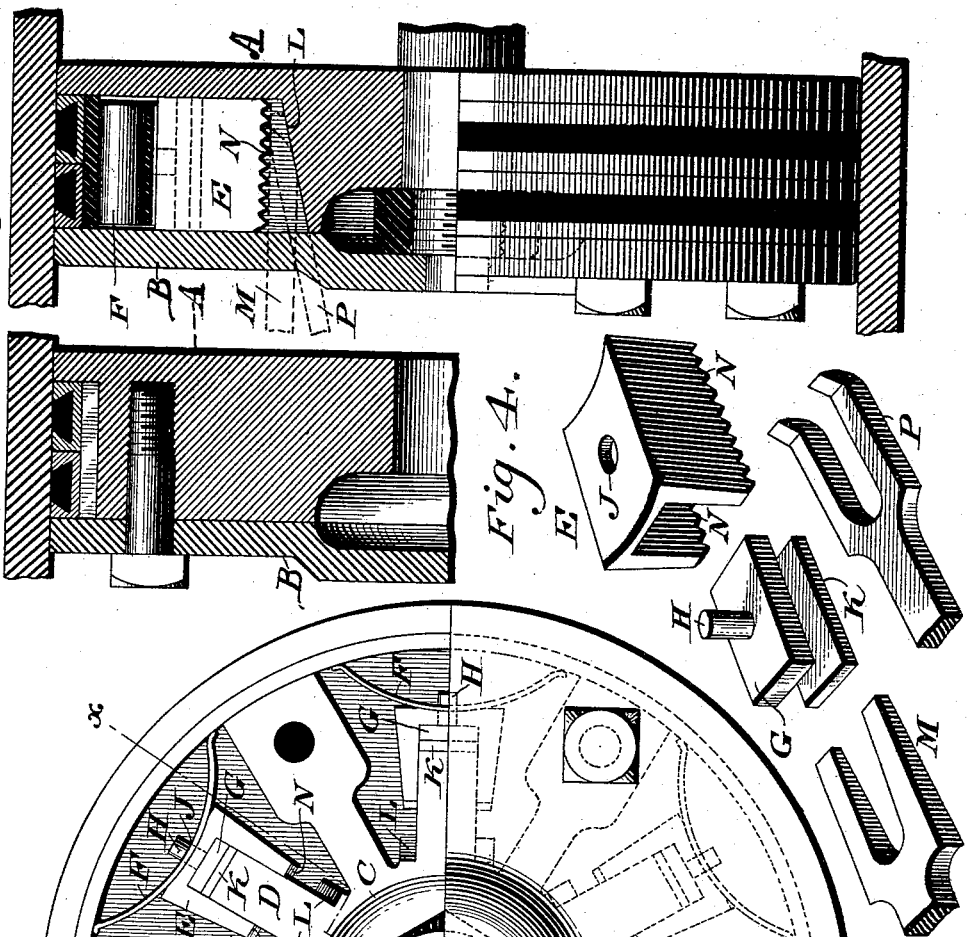
WITNESSES.
P. H. Nagle.
L. Douville
INVENTOR.
Jackson Richards
John A. Wiedersheim
BY  ATTORNEY.

UNITED STATES PATENT OFFICE.

JACKSON RICHARDS, OF PHILADELPHIA, PENNSYLVANIA, ASSIGNOR TO THE RICHARDS PISTON PACKING COMPANY, LIMITED, OF SAME PLACE.

PISTON-PACKING.

SPECIFICATION forming part of Letters Patent No. 487,494, dated December 6, 1892.

Application filed February 3, 1892. Serial No. 420,669. (No model.)

*To all whom it may concern:*

Be it known that I, JACKSON RICHARDS, a citizen of the United States, residing in the city and county of Philadelphia, State of Pennsylvania, have invented a new and useful Improvement in Piston-Packings, which improvement is fully set forth in the following specification and accompanying drawings.

My invention relates to improvements in piston-packing; and it consists, first, of a piston having a spider with inclines on the hub on each side of its arms, springs for the packing-rings, clips, filling-pieces, pins, and liners, the latter being located between the said packing-ring, springs, and the arms, as will be hereinafter set forth.

Figure 1 represents a partial face view and partial interior view of a piston with packing embodying my invention. Fig. 2 represents a partial side elevation and partial diametrical section thereof on line *x x*, Fig. 1. Fig. 3 represents a section of a portion on line *y y*, Fig. 1. Fig. 4 represents views of details.

Similar letters of reference indicate corresponding parts in the several figures.

Referring to the drawings, A designates the head, and B the follower, of a piston.

C designates the spider, on the arms D of which are the clips E, which freely embrace said arms and have curved seats on the outer ends thereof for supporting the springs F, which bear against the packing-rings of the piston.

G designates filling-pieces, each of which consists of a plate fitted between the sides of the clip E against the inner face of the outer end thereof and provided with a pin H, which projects through an opening J in said end of the clip and enters the spring F, seated thereon, thus retaining said spring in position. Interposed between the filling-pieces and the arms D are liners K, whereby the proper tension is imparted to the springs. On the hub of the spider and on opposite sides of the arms are inclined planes L, which are adapted to support the wedging-tool M and move the clips E from their seats, as will be hereinafter referred to. The inner ends of the sides of the clips E are serrated, as at N, so that the claw-lever P may engage therewith for removal of the clips when so desired, it being noticed that when the head A is removed the lever may be introduced into the packing, so as to straddle the proper arm D, and as it is fulcrumed on the spider and its claw engages with the teeth of the clip by properly working the lever the clip may be removed and with it the filling-piece, liner, and spring. Should either part be broken, it may be readily disconnected, replaced, and reapplied. When the parts are in position, should it be desired to adjust the tension of the springs, to apply additional liners, or remove the liners in existence the implement or tool M is employed. In this case the wedging end of said tool is placed upon the proper inclined planes and forced inwardly, thus riding against the inner edges of the clip, whereby as the spring is overcome the clip moves from its seat on the filling-piece and allows of the separation of said piece from the liner, so that the latter is free to be removed, or an additional liner or a liner of a different size may be inserted between the filling-piece and the arm of the spider. When the wedge is withdrawn, the clip, the filling-piece, and the spring return to their normal positions.

Having thus described my invention, what I claim as new, and desire to secure by Letters Patent, is—

1. A piston having a spider with inclined hub, springs for the packing-rings, clips freely fitted on the arms of the spider and having seats for said springs, filling-pieces located within said clips, pins on the filling-pieces, passing through the clips into the springs, and liners interposed between said clips and arms, substantially as described.

2. In a piston, a clip forming a seat for a packing-ring and an arm of the spider of the piston supporting the same, the side of said clip having teeth for the engagement of a removing-lever, substantially as described.

3. A piston having a spider, a clip fitted freely thereon, and a spring for the packing-rings, mounted on said clip, said spider having an inclined plane whereby by means of a proper tool said clip may be moved on its seat, substantially as described.

4. A piston having a head and follower with spider, arms on said spider, inclined planes on the hub of the spider on opposite sides of said arms, clips embracing said arms and having serrations on their sides, filling-pieces with pins passing through openings in said clips, liners between the ends of the arms and the filling-pieces, and springs seated on said clips and bearing against the packing-rings of the piston, said parts being combined substantially as described.

JACKSON RICHARDS.

Witnesses:
 JAMES BOSSERT,
 PHILIP J. BREISH.